United States Patent
Shi et al.

(10) Patent No.: US 10,826,123 B2
(45) Date of Patent: Nov. 3, 2020

(54) LITHIUM-ION BATTERY ELECTROLYTE AND LITHIUM-ION BATTERY

(71) Applicant: SHENZHEN CAPCHEM TECHNOLOGY CO., LTD., Pingshan District, Shenzhen (CN)

(72) Inventors: Qiao Shi, Shenzhen (CN); Muchong Lin, Shenzhen (CN); Shiguang Hu, Shenzhen (CN); Hailing Zhang, Shenzhen (CN); Qi Guo, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 168 days.

(21) Appl. No.: 16/084,929

(22) PCT Filed: Jul. 27, 2016

(86) PCT No.: PCT/CN2016/091881
§ 371 (c)(1),
(2) Date: Sep. 13, 2018

(87) PCT Pub. No.: WO2017/173743
PCT Pub. Date: Oct. 12, 2017

(65) Prior Publication Data
US 2019/0089000 A1    Mar. 21, 2019

(30) Foreign Application Priority Data
Apr. 8, 2016 (CN) .......................... 2016 1 0218844

(51) Int. Cl.
| H01M 10/0567 | (2010.01) |
| H01M 10/0525 | (2010.01) |
| H01M 4/525 | (2010.01) |
| H01M 10/0569 | (2010.01) |
| H01M 10/0568 | (2010.01) |

(52) U.S. Cl.
CPC ... *H01M 10/0567* (2013.01); *H01M 10/0525* (2013.01); *H01M 10/0569* (2013.01); *H01M 4/525* (2013.01); *H01M 10/0568* (2013.01); *H01M 2300/004* (2013.01)

(58) Field of Classification Search
CPC ......... H01M 10/0567; H01M 10/0525; H01M 4/13; H01M 4/36
See application file for complete search history.

(56) References Cited

U.S. PATENT DOCUMENTS

| 2003/0113635 A1* | 6/2003 | Gan ...................... H01M 4/485 429/326 |
| 2009/0181301 A1* | 7/2009 | Kim ...................... H01M 4/364 429/199 |
| 2016/0301104 A1 | 10/2016 | Shi et al. |
| 2018/0076483 A1* | 3/2018 | Shi .................... H01M 10/0525 |
| 2018/0076488 A1* | 3/2018 | Shi ........................ H01M 4/525 |

FOREIGN PATENT DOCUMENTS

| CN | 104269577 A | 1/2015 |
| CN | 105140566 A | 12/2015 |
| CN | 105374980 A | 3/2016 |
| CN | 105428717 A | 3/2016 |
| CN | 105742707 A | 7/2016 |

OTHER PUBLICATIONS

International Search Report for PCT/CN2016/091881 dated Jan. 9, 2017 and its English translation provided by WIPO.
Written Opinion of the International Search Authority PCT/CN2016/091881 dated Jan. 9, 2017 and its English translation provided by Google Translate.

* cited by examiner

*Primary Examiner* — Kenneth J Douyette
(74) *Attorney, Agent, or Firm* — Ladas & Parry, LLP

(57) ABSTRACT

The present invention discloses a lithium-ion battery electrolyte and a lithium-ion battery. The electrolyte comprises an organic non-aqueous solution, a lithium salt, and an additive. The additive comprises: (A) fluoroethylene carbonate; (B) at least one compound from the following: a saturated dinitrile or an unsaturated nitrile as represented by structural formula (1), wherein $R_1$ is an unsaturated hydrocarbon group with 3-6 carbon atoms and $R_2$ is an alkene group with 2-5 carbon atoms; and (C) at least one unsaturated phosphate ester as represented by structural formula (2), wherein $R_3$, $R_4$, and $R_5$ are each a hydrocarbon with 1-4 carbon atoms, and at least one of $R_3$, $R_4$, and $R_5$ contain an unsaturated hydrocarbon with a triple bond.

formula 1
$$R_1\diagdown_O\diagup R_2\diagdown CN$$

formula 2
$$R_4\diagdown_O\diagup \underset{\underset{O}{|}}{\overset{\overset{O}{\|}}{P}}\diagdown_O\diagup R_3$$
$$R_5$$

14 Claims, No Drawings

LITHIUM-ION BATTERY ELECTROLYTE AND LITHIUM-ION BATTERY

CROSS-REFERENCE TO RELATED APPLICATIONS

The present application is the U.S. National Phase of PCT/CN2016/091881 filed on Jul. 27, 2016 which claims priority to the Chinese patent application No. 201610218844.2, filed with the Chinese State Intellectual Property Office on Apr. 8, 2016, which are incorporated herein by reference in their entireties.

TECHNICAL FIELD

The present invention relates to the field of lithium-ion battery technology, and in particular to an electrolyte for a lithium-ion battery and a lithium-ion battery comprising the electrolyte.

BACKGROUND OF THE INVENTION

At present, lithium-ion batteries with a non-aqueous electrolyte are being used more and more in the market of 3C consumer electronic products. With the advancement of technology, the functions of digital products become increasingly diverse and powerful, and the issue of insufficient battery life becomes more and more marked. High energy density represents the trend of development of lithium-ion batteries for 3C digital electronic products, and high-voltage lithium cobaltate material represents a mainstream solution in the field of cathode materials in at least 5 years in the future.

However, as the voltage for lithium cobaltate increases, the overall performances of the battery will be significantly degraded. The main reason is that the lithium cobaltate cathode material is unstable. As the voltage increases, Co metal ions dissolves from the cathode, causing collapse of the structure of the cathode material, and the dissolved Co ions are reduced on the anode, causing disruption of the structure of the anode. In addition, as the voltage of the cathode increases, the electrolyte is decomposed on the cathode, which deteriorates the stability of the battery system and finally leads to a significant drop in battery performances. Therefore, with the continuous increase in the charging cut-off voltage, an electrolyte adapted to high voltage constitutes a key factor restricting the development of high-voltage lithium cobaltate batteries.

Presently, there are some electrolyte products for 4.4V lithium cobaltate battery systems in the domestic and foreign markets. These electrolyte products generally contain traditional film-forming additives such as fluoroethylene carbonate (FEC) and 1,3-propane sultone (1,3-PS). PS has a good effect in balancing the high- and low-temperature performances of the battery. The reason is that PS has a certain effect of film-forming on the cathode, which can protect the cathode and inhibit decomposition of the electrolyte, and it also has a marked effect of film-forming on the anode, which can increase the stability of the anode. Moreover, within a certain range of the content of PS, the higher the PS content, the better the high temperature performance of the battery, and the relatively smaller increase in the impedance of the battery, without a great influence on the kinetic performance of lithium ions. Therefore, currently available high-voltage electrolytes generally contain a relatively high content of PS. However, the latest REACH regulations of the European Union place PS in the latest SVHC list due to its carcinogenicity and require that the content of PS in an article should not exceed 0.1%. This greatly limits the application of PS in high-voltage electrolytes.

SUMMARY OF THE INVENTION

The present invention provides an electrolyte for a lithium-ion battery and a lithium-ion battery comprising the electrolyte, the additive of the electrolyte including fluoroethylene carbonate, a saturated dinitrile compound or an unsaturated nitrile compound, and an unsaturated phosphate ester compound. In the absence of a sulfonate ester compound, the additive combination can form an excellent SEI film on an anode to stabilize the anode; and at the same time can form a good protective film on a cathode to complex metal ions, thereby inhibiting dissolution of metal ions and decomposition of the electrolyte on the cathode, and significantly improving the high-temperature storage performance of the battery.

According to a first aspect of the present invention, there is provided an electrolyte for a lithium-ion battery, comprising a non-aqueous organic solvent, a lithium salt and an additive, the additive comprising:

(A) fluoroethylene carbonate;
(B) at least one compound selected from a saturated dinitrile compound, or an unsaturated nitrile compound represented by structural formula 1,

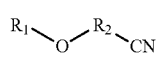

structural formula 1 wherein $R_1$ is selected from an unsaturated hydrocarbyl group having 3 to 6 carbon atoms, and $R_2$ is selected from a hydrocarbylene group having 2 to 5 carbon atoms; and
(C) at least one compound selected from an unsaturated phosphate ester compound represented by structural formula 2,

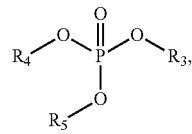

structural formula 2 wherein $R_3$, $R_4$ and $R_5$ are each independently selected from a hydrocarbyl group having 1 to 4 carbon atoms, and at least one of $R_3$, $R_4$ and $R_5$ is an unsaturated hydrocarbyl group having a triple bond.

As a further improvement of the present invention, the additive (A) accounts for 1% to 10%, preferably 1% to 5% of the total weight of the electrolyte.

As a further improvement of the present invention, the saturated dinitrile compound accounts for 1% to 5%, preferably 1% to 3% of the total weight of the electrolyte; and the unsaturated nitrile compound represented by structural formula 1 accounts for 0.1% to 3%, preferably 0.2% to 2% of the total weight of the electrolyte.

As a further improvement of the present invention, the additive (C) accounts for 0.1% to 2%, preferably 0.2% to 1% of the total weight of the electrolyte.

As a further improvement of the present invention, the saturated dinitrile compound is selected from one or more of succinonitrile, glutaronitrile, adiponitrile, pimelonitrile, suberonitrile, azelanitrile and sebaconitrile; and the unsaturated nitrile compound represented by structural formula 1 is selected from at least one of a compound represented by the following structural formula 3 or structural formula 4:

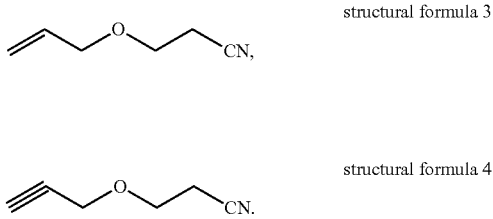

As a further improvement of the present invention, the unsaturated phosphate ester compound represented by structural formula 2 is tripropargyl phosphate.

As a further improvement of the present invention, the non-aqueous organic solvent is selected from one or more of ethylene carbonate, propylene carbonate, butylene carbonate, dimethyl carbonate, diethyl carbonate, ethyl methyl carbonate and methyl propyl carbonate; and is preferably a combination of ethylene carbonate, diethyl carbonate and ethyl methyl carbonate.

As a further improvement of the present invention, the lithium salt is selected from one or more of $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

According to a second aspect of the present invention, there is provided a lithium-ion battery, comprising a cathode, an anode, and a separator interposed between the cathode and the anode, and further comprising the electrolyte for a lithium-ion battery according to the first aspect.

As a further preferred embodiment of the present invention, the active material of the cathode is lithium cobaltate.

The additive combination in the electrolyte for a lithium-ion battery according to the present invention includes fluoroethylene carbonate, a saturated dinitrile compound or an unsaturated nitrile compound, and an unsaturated phosphate ester compound. Present in the same electrolyte system, these additives can, probably through a synergistic effect, form an excellent SEI film on an anode to stabilize the anode; and at the same time can form a good protective film on a cathode to complex metal ions, thereby inhibiting dissolution of metal ions and decomposition of the electrolyte on the cathode, and significantly improving the high-temperature storage performance of the battery.

DETAILED DESCRIPTION

The invention will now be described in further detail by way of specific embodiments.

The present invention uses a combination of fluoroethylene carbonate (FEC), a saturated dinitrile compound or an unsaturated nitrile compound, and an unsaturated phosphate ester compound as an electrolyte additive.

The FEC added in the present invention mainly serves to form an excellent SEI film on an anode, ensuring excellent cycling performance of a high-voltage battery. The content of FEC is preferably 1% to 10%, more preferably 1% to 5% of the total weight of the electrolyte. When the content of FEC is less than 1%, an excellent SEI cannot be formed on the anode, and the cycling performance of the battery may not be desirably improved; while when the content exceeds 10%, it is easy to generate HF and LiF at high temperatures, which may deteriorate the high-temperature performance of the battery.

The saturated dinitrile compound added in the present invention can complex with metal ions to reduce decomposition of the electrolyte, inhibit metal ion dissolution, protect the cathode, thus improving the high-temperature performance of the battery. The unsaturated nitrile compound added in the present invention can not only complex with metal ions, but also form a film on the cathode. The double effects of complexation and film-forming of the unsaturated nitrile compound serve to better improve the high-temperature performance of the battery.

In the present invention, the saturated dinitrile compound may be selected from one or more of succinonitrile, glutaronitrile, adiponitrile, pimelonitrile, suberonitrile, azelanitrile and sebaconitrile. The unsaturated nitrile compound has a chemical structure represented by structural formula 1,

wherein $R_1$ is selected from an unsaturated hydrocarbyl group having 3 to 6 carbon atoms, and $R_2$ is selected from a hydrocarbylene group having 2 to 5 carbon atoms.

The compound of structural formula 1 can be obtained by the following reaction route:

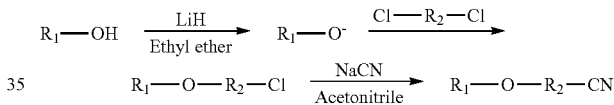

The reaction principles and process conditions involved in the above reaction schemes are well-known and well-established in the art, and those skilled in the art can readily synthesize the compound for the present invention.

While the mechanism of action of the compound represented by structural formula 1 is not well understood, the present inventors speculate that it may be that the molecular structure of the compound represented by structural formula 1 contains an unsaturated carbon-carbon bond and a cyano group at the same time. On the one hand, the carbon-carbon unsaturated bond may allow for a polymerization reaction, i.e., a film-forming effect to occur on the surface of the electrode during the charging process, which serves to suppress oxidative decomposition of the electrolyte, and on the other hand, the cyano group in the structure can effectively complex metal ions on the cathode, which serves to suppress dissolution of the metal ions. Through synergy of the two aspects, the high-temperature storage performance and cycling performance of the battery can be effectively improved.

In the compound represented by structural formula 1, the number of carbon atoms of the $R_1$ group has an important influence on the properties of the compound. After in-depth study, the prevent inventors found that when $R_1$ is selected from an unsaturated hydrocarbyl group having a carbon atom number of 3 to 6, the above-mentioned effects can be remarkably achieved, while when $R_1$ is selected from an unsaturated hydrocarbyl group having a carbon atom number of more than 6, the compound formed on the surface of the electrode has too high an impedance, and has a decreased effect in complexing metal ions, which instead lowers the high-temperature storage performance and cycling performance of the battery.

The present inventors also found that the value of $R_2$ also has an important influence on the performance of the compound. When $R_2$ is a hydrocarbylene group having 2 to 5 carbon atoms, the above-mentioned effects can be remarkably achieved, while when the carbon atom number is more than 5, the compound formed on the surface of the electrode has too high an impedance, and has a decreased effect in complexing metal ions, which instead lowers the high-temperature storage performance and cycling performance of the battery.

In the compound represented by structural formula 1, the $R_1$ group is a linear or branched unsaturated hydrocarbyl group, the linear unsaturated hydrocarbyl group being for example an alkenyl group or an alkynyl group, typical but not limiting examples of the alkenyl group being for example propenyl group, allyl group, butenyl, pentenyl or hexenyl group, and typical but not limiting examples of the alkynyl group being for example propynyl, propargyl, butynyl, pentynyl or hexynyl group; and the $R_2$ group is a hydrocarbylene group, which may be a linear or branched saturated hydrocarbylene group, or a branched or linear unsaturated hydrocarbylene group, typical but not limiting examples of the linear saturated hydrocarbylene group being for example ethylene, propylene, butylene or pentylene group.

In some embodiments of the present invention, the unsaturated nitrile compound represented by structural formula 1 is selected from at least one of a compound represented by structural formula 3 or structural formula 4:

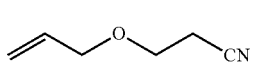

structural formula 3

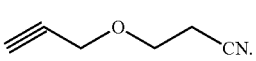

structural formula 4

In the present invention, the content of the saturated dinitrile compound is preferably 1% to 5%, more preferably 1% to 3% of the total weight of the electrolyte. When the content is less than 1%, it is difficult for the compound to sufficiently exert its effect, and when the content is higher than 5%, there may be adverse effects. The content of the unsaturated nitrile compound represented by structural formula 1 is preferably 0.1% to 3% of the total weight of the electrolyte. When the content is less than 0.1%, the effect in complexing metal ions is poor, such that it is difficult to sufficiently improve the high-temperature storage performance and cycling performance of the battery, and when the content exceeds 3%, an excessively thick passivation film may be formed on the surface of the electrode, and the internal resistance of the battery is too high, leading to deterioration of battery performances. In a more preferred embodiment of the present invention, the content of the unsaturated nitrile compound represented by structural formula 1 is 0.2% to 2% of the total mass of the electrolyte. In the present invention, the saturated dinitrile compound and the unsaturated nitrile compound may be used singly or in combination.

In the present invention, at least one compound selected from an unsaturated phosphate ester compound represented by structural formula 2 is added,

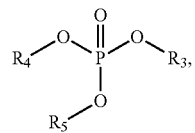

structural formula 2 wherein $R_3$, $R_4$ and $R_5$ are each independently selected from a hydrocarbyl group having 1 to 4 carbon atoms, and at least one of $R_3$, $R_4$ and $R_5$ is an unsaturated hydrocarbyl group having a triple bond.

In a preferred embodiment of the present invention, the unsaturated phosphate ester compound represented by structural formula 2 accounts for 0.1% to 2%, preferably 0.2% to 1% of the total weight of the electrolyte. The compound can form a film on the cathode and the anode, which effectively protects the cathode and the anode and improves the high-temperature performances of the lithium-ion battery, especially the high-temperature cycling performance. When the content is less than 0.1%, the effect in forming a film on the cathode and the anode is poor, and the performance of the battery is not desirably improved; while when the content is more than 2%, the film formed at the electrode interface is relatively thick, which would seriously increase battery impedance and degrade battery performances.

In a preferred embodiment of the present invention, the unsaturated phosphate ester compound represented by structural formula 2 is tripropargyl phosphate, that is, a compound represented by the following structural formula 5:

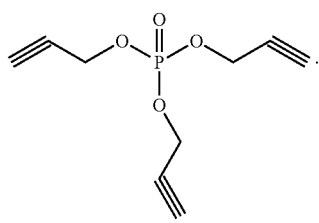

structural formula 5

In a preferred embodiment of the present invention, the non-aqueous organic solvent is selected from one or more of ethylene carbonate, propylene carbonate, butylene carbonate, dimethyl carbonate, diethyl carbonate, ethyl methyl carbonate and methyl propyl carbonate; and is more preferably a combination of ethylene carbonate, diethyl carbonate and ethyl methyl carbonate.

The above-mentioned ethylene carbonate, propylene carbonate and butylene carbonate are cyclic carbonates, while dimethyl carbonate, diethyl carbonate, ethyl methyl carbonate and methyl propyl carbonate are linear carbonates. A mixture of a cyclic carbonate organic solvent with high dielectric constant and a linear carbonate organic solvent with low viscosity is used as a solvent for the lithium-ion battery electrolyte, so that the organic solvent mixture has high ionic conductivity, high dielectric constant and low viscosity at the same time.

In a preferred embodiment of the present invention, the lithium salt is selected from one or more of $LiPF_6$, $LiBF_4$, $LiSbF_6$, $LiAsF_6$, $LiN(SO_2CF_3)_2$, $LiN(SO_2C_2F_5)_2$, LiC $(SO_2CF_3)_3$ and $LiN(SO_2F)_2$, preferably $LiPF_6$ or a mixture of $LiPF_6$ with one or more other lithium salts.

One embodiment of the present invention provides a lithium-ion battery, comprising a cathode, an anode, and a separator interposed between the cathode and the anode, and further comprising the electrolyte for a lithium-ion battery according to the present invention.

The cathode material for the lithium-ion battery according to the present invention may be selected from one or more of $LiCoO_2$, $LiNiO_2$, $LiMn_2O_4$, $LiCo_{1-y}M_yO_2$, $LiNi_{1-y}M_yO_2$, $LiMn_{2-y}M_yO_4$ and $LiNi_xCo_yMn_zM_{1-x-y-z}O_2$, wherein M is selected from one or more of Fe, Co, Ni, Mn, Mg, Cu, Zn, Al, Sn, B, Ga, Cr, Sr, V, and Ti, and $0 \le y \le 1$, $0 \le x \le 1$, $0 \le z \le 1$, $x+y+z \le 1$. In a preferred embodiment of the present invention, the active material of the cathode is lithium cobaltate ($LiCoO_2$).

With the electrolyte according to the present invention, the charging cut-off voltage of the lithium-ion battery according to the present invention can be made greater than 4.2 V and less than or equal to 4.5 V. In a preferred embodiment of the present invention, the charging cut-off voltage is 4.4V.

The electrolyte for a lithium-ion battery according to the present invention, having a combination of fluoroethylene carbonate, a saturated dinitrile compound or an unsaturated nitrile compound and an unsaturated phosphate ester compound, ensures excellent cycling performance of a high-voltage battery and effectively improves high-temperature storage performance of the high-voltage battery.

The present invention is described in more detail below by reference to specific examples. It is to be understood that the examples are merely illustrative and are not intended to limit the scope of protection of the present invention.

EXAMPLE 1

1) Preparation of Electrolyte

Ethylene carbonate (EC), diethyl carbonate (DEC) and ethyl methyl carbonate (EMC) were mixed at a mass ratio of EC:DEC:EMC=1:1:1, then lithium hexafluorophosphate ($LiPF_6$) was added to a molar concentration of 1 mol/L, and then based on the total mass of the electrolyte, 1% of FEC, 1% of succinonitrile and 2% of tripropargyl phosphate were added as additive.

2) Preparation of Cathode Plate

Lithium cobaltate ($LiCoO_2$) as cathode active material, Super-P as conductive carbon black and polyvinylidene fluoride (PVDF) as binder were mixed at a mass ratio of 93:4:3. The mixture was dispersed in N-methyl-2-pyrrolidone (NMP) to obtain a cathode slurry. The slurry was uniformly coated onto both sides of an aluminum foil, oven dried, calendered and vacuum dried. Then an aluminum lead wire was welded to the foil by an ultrasonic welder to obtain a cathode plate having a thickness of 120-150 μm.

3) Preparation of Anode Plate

Artificial graphite as anode active material, Super-P as conductive carbon black, and styrene butadiene rubber (SBR) and carboxymethyl cellulose (CMC) as binder were mixed at a mass ratio of 94:1:2.5:2.5. The mixture was dispersed in deionized water to obtain an anode slurry. The slurry was coated onto both sides of a copper foil, oven dried, calendered and vacuum dried. Then a nickel lead wire was welded to the foil by an ultrasonic welder to obtain an anode plate having a thickness of 120-150 μm.

4) Preparation of Battery Core

A polyethylene microporous film having a thickness of 20 μm was placed as a separator between the cathode plate and the anode plate, and the resulting sandwich structure composed of the cathode plate, the anode plate and the separator was wound. Then, the wound structure was flattened and placed into an aluminum-plastic film packing bag, and baked at 85° C. for 24 hours to obtain a battery core, which was to be injected with the electrolyte.

5) Injection of the Electrolyte Into the Battery Core and Battery Formation

In a glove box in which dew point was controlled below −40° C., the electrolyte prepared above was injected into the battery core in an amount such that the electrolyte filled the void in the battery core. Then, battery formation was carried out in the following steps: 0.05 C constant-current charging for 180 min, 0.1 C constant-current charging for 240 min, leaving to stand for 1 hr followed by shaping and sealing under vacuum, and further, 0.2 C constant-current charging to 4.4V, leaving to stand at ordinary temperatures for 24 hr, followed by 0.2 C constant-current discharging to 3.0V.

6) Test of Cycling Performance at Ordinary Temperatures

At ordinary temperatures, the battery was charged to 4.4V at a constant-current of 1 C and then charged at a constant voltage until the current dropped to 0.1 C, followed by being discharged to 3.0V at a constant-current of 1 C. This cycling was repeated for 500 cycles, and the discharge capacity of the 1st cycle and that of the 500th cycle were recorded. The capacity retention rate for high-temperature cycling was calculated as follows:

Capacity retention rate=discharge capacity of the 500th cycle/discharge capacity of the 1st cycle*100%

7) Test of High-Temperature Storage Performance

The formed battery was subjected to 1 C constant-current and constant-voltage charging to 4.4V at ordinary temperatures, and the initial thickness and initial discharge capacity of the battery were measured. Then, the battery was stored at 60° C. for 30 days. Then, after allowing the battery to cool to ordinary temperatures, the final thickness of the battery was measured, and the battery thickness expansion rate was calculated. And then, the battery was subjected to 1 C discharging to 3V, and the battery retention capacity and recovery capacity were measured. The formulae for calculation are as follows:

Battery capacity retention rate (%)=retention capacity/initial capacity×100%;

Battery capacity recovery rate (%)=recovery capacity/initial capacity×100%;

Battery thickness expansion rate (%)=(final thickness−initial thickness)/initial thickness×100%.

8) Test of Low-Temperature Performance

At 25° C., the formed battery was subjected to 1 C constant-current and constant-voltage charging to 4.4V, and then 1 C constant discharging to 3.0V, and the discharge capacity was recorded. Then, the battery was subjected to 1 C constant-current and constant-voltage charging to 4.4V, left to stand in an environment of −20° C. for 12 hours, and then subjected to 0.2 C constant-current discharging to 3.0V, and the discharge capacity was recorded.

Low-temperature discharge efficiency value at −20° C.=0.2 C discharge capacity at −20° C./1 C discharge capacity at 25° C.×100%.

EXAMPLE 2

As shown in Table 1, this example was the same as Example 1 except that the additive in the preparation of the electrolyte was replaced with 1% of FEC, 2% of succinonitrile, 2% of adiponitrile, 1% of glutaronitrile, and 0.2% of triacetylpropane phosphate. The data of the cycling performance, high-temperature storage performance and low-temperature performance obtained in the test are shown in Table 2.

EXAMPLE 3

As shown in Table 1, this example was the same as Example 1 except that the additive in the preparation of the electrolyte was replaced with 5% of FEC, 1% of succinonitrile, and 2% of triacetylpropane phosphate. The data of the cycling performance, high-temperature storage performance and low-temperature performance obtained in the test are shown in Table 2.

EXAMPLE 4

As shown in Table 1, this example was the same as Example 1 except that the additive in the preparation of the electrolyte was replaced with 5% of FEC, 1% of succinonitrile, 1% of adiponitrile, and 1% of triacetylpropane phosphate. The data of the cycling performance, high-temperature storage performance and low-temperature performance obtained in the test are shown in Table 2.

EXAMPLE 5

As shown in Table 1, this example was the same as Example 1 except that the additive in the preparation of the electrolyte was replaced with 5% of FEC, 2% of succinonitrile, 2% of adiponitrile, 1% of glutaronitrile, and 0.5% of triacetylpropane phosphate. The data of the cycling performance, high-temperature storage performance and low-temperature performance obtained in the test are shown in Table 2.

EXAMPLE 6

As shown in Table 1, this example was the same as Example 1 except that the additive in the preparation of the electrolyte was replaced with 10% of FEC, 1% of succinonitrile, and 1% of triacetylpropane phosphate. The data of the cycling performance, high-temperature storage performance and low-temperature performance obtained in the test are shown in Table 2.

EXAMPLE 7

As shown in Table 1, this example was the same as Example 1 except that the additive in the preparation of the electrolyte was replaced with 10% of FEC, 1% of succinonitrile, 1% of adiponitrile, and 0.5% of triacetylpropane phosphate. The data of the cycling performance, high-temperature storage performance and low-temperature performance obtained in the test are shown in Table 2.

EXAMPLE 8

As shown in Table 1, this example was the same as Example 1 except that the additive in the preparation of the electrolyte was replaced with 5% of FEC, 0.1% of the compound represented by structural formula 3, and 0.5% of triacetylpropane phosphate. The data of the cycling performance, high-temperature storage performance and low-temperature performance obtained in the test are shown in Table 2.

EXAMPLE 9

As shown in Table 1, this example was the same as Example 1 except that the additive in the preparation of the electrolyte was replaced with 5% of FEC, 1% of the compound represented by structural formula 3, and 0.5% of triacetylpropane phosphate. The data of the cycling performance, high-temperature storage performance and low-temperature performance obtained in the test are shown in Table 2.

EXAMPLE 10

As shown in Table 1, this example was the same as Example 1 except that the additive in the preparation of the electrolyte was replaced with 10% of FEC, 3% of the compound represented by structural formula 3, and 0.5% of triacetylpropane phosphate. The data of the cycling performance, high-temperature storage performance and low-temperature performance obtained in the test are shown in Table 2.

EXAMPLE 11

As shown in Table 1, this example was the same as Example 1 except that the additive in the preparation of the electrolyte was replaced with 10% of FEC, 1% of the compound represented by structural formula 3, and 2% of triacetylpropane phosphate. The data of the cycling performance, high-temperature storage performance and low-temperature performance obtained in the test are shown in Table 2.

EXAMPLE 12

As shown in Table 1, this example was the same as Example 1 except that the additive in the preparation of the electrolyte was replaced with 5% of FEC, 1% of the compound represented by structural formula 4, and 0.5% of triacetylpropane phosphate. The data of the cycling performance, high-temperature storage performance and low-temperature performance obtained in the test are shown in Table 2.

EXAMPLE 13

As shown in Table 1, this example was the same as Example 1 except that the additive in the preparation of the electrolyte was replaced with 1% of FEC, 1% of succinonitrile, 1% of adiponitrile, 0.5% of the compound represented by structural formula 3, and 0.2% of triacetylpropane phosphate. The data of the cycling performance, high-temperature storage performance and low-temperature performance obtained in the test are shown in Table 2.

EXAMPLE 14

As shown in Table 1, this example was the same as Example 1 except that the additive in the preparation of the electrolyte was replaced with 5% of FEC, 1% of succinonitrile, 1% of adiponitrile, 1% of the compound represented by structural formula 3, and 1% of triacetylpropane phosphate. The data of the cycling performance, high-temperature storage performance and low-temperature performance obtained in the test are shown in Table 2.

EXAMPLE 15

As shown in Table 1, this example was the same as Example 1 except that the additive in the preparation of the electrolyte was replaced with 10% of FEC, 2% of succinonitrile, 2% of adiponitrile, 1% of glutaronitrile, 2% of the compound represented by structural formula 3, and 0.5% of triacetylpropane phosphate. The data of the cycling performance, high-temperature storage performance and low-temperature performance obtained in the test are shown in Table 2.

COMPARATIVE EXAMPLE 1

As shown in Table 1, this example was the same as Example 1 except that the additive in the preparation of the electrolyte was replaced with 5% of FEC. The data of the cycling performance, high-temperature storage performance and low-temperature performance obtained in the test are shown in Table 2.

COMPARATIVE EXAMPLE 2

As shown in Table 1, this example was the same as Example 1 except that the additive in the preparation of the electrolyte was replaced with 1% of triacetylpropane phosphate. The data of the cycling performance, high-temperature storage performance and low-temperature performance obtained in the test are shown in Table 2.

COMPARATIVE EXAMPLE 3

As shown in Table 1, this example was the same as Example 1 except that the additive in the preparation of the electrolyte was replaced with 1% of succinonitrile and 1% of adiponitrile. The data of the cycling performance, high-temperature storage performance and low-temperature performance obtained in the test are shown in Table 2.

COMPARATIVE EXAMPLE 4

As shown in Table 1, this example was the same as Example 1 except that the additive in the preparation of the electrolyte was replaced with 5% of FEC, 1% of succinonitrile, and 1% of adiponitrile. The data of the cycling performance, high-temperature storage performance and low-temperature performance obtained in the test are shown in Table 2.

COMPARATIVE EXAMPLE 5

As shown in Table 1, this example was the same as Example 1 except that the additive in the preparation of the electrolyte was replaced with 5% of FEC, 1% of succinonitrile, 1% of adiponitrile, and 2% of 1,3-PS. The data of the cycling performance, high-temperature storage performance and low-temperature performance obtained in the test are shown in Table 2.

Table 1 shows the addition of the electrolyte additive in the above examples and comparative examples.

TABLE 1

| Example | FEC | Saturated dinitrile compound | Unsaturated nitrile compound | Triacetylpropane phosphate | 1,3-PS |
|---|---|---|---|---|---|
| Example 1 | 1% | Succinonitrile: 1% | — | 2% | — |
| Example 2 | 1% | Succinonitrile: 2%, Adiponitrile: 2%, Glutaronitrile: 1% | — | 0.2% | — |
| Example 3 | 5% | Succinonitrile: 1% | — | 2% | — |
| Example 4 | 5% | Succinonitrile: 1%, Adiponitrile: 1% | — | 1% | — |
| Example 5 | 5% | Succinonitrile: 2%, Adiponitrile: 2%, Glutaronitrile: 1% | — | 0.5% | — |
| Example 6 | 10% | Succinonitrile: 1% | — | 1% | — |
| Example 7 | 10% | Succinonitrile: 1%, Adiponitrile: 1% | — | 0.5% | — |
| Example 8 | 5% | — | Compound represented by structural formula 3 0.1% | 0.5% | — |
| Example 9 | 5% | — | Compound represented by structural formula 3: 1% | 0.5% | — |
| Example 10 | 10% | — | Compound represented by structural formula 3: 3% | 0.5% | — |

TABLE 1-continued

| Example | FEC | Saturated dinitrile compound | Unsaturated nitrile compound | Triacetylpropane phosphate | 1,3-PS |
|---|---|---|---|---|---|
| Example 11 | 10% | — | Compound represented by structural formula 3: 1% | 2% | — |
| Example 12 | 5% | — | Compound represented by structural formula 4: 1% | 0.5% | — |
| Example 13 | 1% | Succinonitrile: 1%, Adiponitrile: 1% | Compound represented by structural formula 3: 0.5% | 0.2% | — |
| Example 14 | 5% | Succinonitrile: 1%, Adiponitrile: 1% | Compound represented by structural formula 3: 1% | 1% | — |
| Example 15 | 10% | Succinonitrile: 2%, Adiponitrile: 2%, Glutaronitrile: 1% | Compound represented by structural formula 3: 2% | 0.5 | — |
| Comparative example 1 | 5% | — | — | — | — |
| Comparative example 2 | — | — | — | 1% | — |
| Comparative example 3 | — | Succinonitrile: 1%, Adiponitrile: 1% | — | — | — |
| Comparative example 4 | 5% | Succinonitrile: 1%, Adiponitrile: 1% | — | — | — |
| Comparative example 5 | 5% | Succinonitrile: 1%, Adiponitrile: 1% | — | — | 2% |

Table 2 shows the performance data for the above examples and comparative examples.

Comparing the comparative examples with the examples, it was found that the combination of FEC, a saturated

TABLE 2

| Example | Capacity retention rate after 500 cycles of 1 C recycling at ordinary temperatures | Storage at 60° C. for 30 days | | | 0.2 C discharging efficiency at −20° C. |
|---|---|---|---|---|---|
| | | Retention rate | Recovery rate | Thickness expansion rate | |
| Example 1 | 36.5% | 76.2% | 78.3% | 6.6% | 75.6% |
| Example 2 | 35.6% | 73.4% | 75.6% | 7.6% | 76.8% |
| Example 3 | 87.5% | 73.5% | 76.4% | 8.1% | 76.55 |
| Example 4 | 86.9% | 71.6% | 75.9% | 7.6% | 74.9% |
| Example 5 | 85.6% | 71.6% | 76.5% | 7.9% | 72.8% |
| Example 6 | 89.2% | 74.1% | 79.1% | 8.2% | 72.5% |
| Example 7 | 88.1% | 74.3% | 76.8% | 8.9% | 71.5% |
| Example 8 | 86.8% | 74.2% | 77.3% | 8.6% | 74.6% |
| Example 9 | 85.7% | 74.4% | 76.1% | 7.6% | 73.8% |
| Example 10 | 88.5% | 72.5% | 75.1% | 9.1% | 76.2% |
| Example 11 | 86.7% | 72.1% | 76.4% | 7.8% | 74.1% |
| Example 12 | 85.6% | 73.6% | 75.5% | 7.9% | 75.8% |
| Example 13 | 35.4% | 74.4% | 76.1% | 6.6% | 74.8% |
| Example 14 | 87.5% | 75.5% | 76.2% | 8.1% | 72.2% |
| Example 15 | 88.7% | 71.1% | 75.9% | 7.8% | 73.6% |
| Comparative example 1 | 80.2% | 55.4% | 52.1% | 30.5% | 74.3% |
| Comparative example 2 | 40.3% | 43.5% | 46.2% | 35.6% | 52.6% |
| Comparative example 3 | 28.3% | 62.1% | 59.2% | 28.6% | 62.6% |
| Comparative example 4 | 81.1% | 70.7% | 72.4% | 16.6% | 73.1% |
| Comparative example 5 | 84.6% | 73.5% | 75.1% | 6.5% | 70.2% |

The invention claimed is:

1. An electrolyte for a lithium-ion battery, comprising a non-aqueous organic solvent, a lithium salt and an additive, the additive comprising:
   (A) fluoroethylene carbonate;
   (B) at least one compound selected from unsaturated nitrile compounds represented by structural formula 1, or a combination of at least one compound selected from a saturated dinitrile compound and an unsaturated nitrile compound represented by structural formula 1,

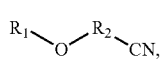
structural formula 1 wherein $R_1$ is selected from an unsaturated hydrocarbyl group having 3 to 6 carbon atoms, and $R_2$ is selected from a hydrocarbylene group having 2 to 5 carbon atoms; and
   (C) at least one compound selected from an unsaturated phosphate ester compound represented by structural formula 2,

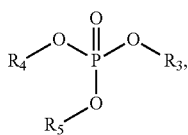
structural formula 2 wherein $R_3$, $R_4$ and $R_5$ are each independently selected from a hydrocarbyl group having 1 to 4 carbon atoms, and at least one of $R_3$, $R_4$ and $R_5$ is an unsaturated hydrocarbyl group having a triple bond.

2. The electrolyte according to claim 1, wherein the additive (A) accounts for 1% to 10% of the total weight of the electrolyte.

3. The electrolyte according to claim 1, wherein the saturated dinitrile compound accounts for 1% to 5% of the total weight of the electrolyte; and the unsaturated nitrile compound represented by structural formula 1 accounts for 0.1% to 3% of the total weight of the electrolyte.

4. The electrolyte according to claim 1, wherein the additive (C) accounts for 0.1% to 2% of the total weight of the above electrolyte.

5. The electrolyte according to claim 1, wherein the saturated dinitrile compound is selected from one or more of succinonitrile, glutaronitrile, adiponitrile, pimelonitrile, suberonitrile, azelanitrile and sebaconitrile; and the unsaturated nitrile compound represented by structural formula 1 is selected from at least one of a compound represented by the following structural formula 3 or structural formula 4:

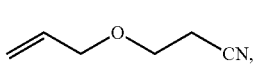
structural formula 3

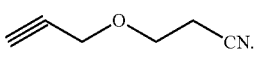
structural formula 4

6. The electrolyte according to claim 1, wherein the unsaturated phosphate ester compound represented by structural formula 2 is tripropargyl phosphate.

7. The electrolyte according to claim 1, wherein the non-aqueous organic solvent is selected from one or more of ethylene carbonate, propylene carbonate, butylene carbonate, dimethyl carbonate, diethyl carbonate, ethyl methyl carbonate and methyl propyl carbonate.

8. The electrolyte according to claim 1, wherein the lithium salt is selected from one or more of $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

9. A lithium-ion battery, comprising a cathode, an anode, and a separator interposed between the cathode and the anode, and further comprising the electrolyte for a lithium-ion battery according to claim 1.

10. The lithium-ion battery according to claim 9, wherein the active material of the cathode is lithium cobaltate.

11. The electrolyte according to claim 1, wherein the additive (A) accounts for 1% to 5% of the total weight of the electrolyte.

12. The electrolyte according to claim 1, wherein the saturated dinitrile compound accounts for 1% to 3% of the total weight of the electrolyte; and the unsaturated nitrile compound represented by structural formula 1 accounts for 0.2% to 2% of the total weight of the electrolyte.

13. The electrolyte according to claim 1, wherein the additive (C) accounts for 0.2% to 1% of the total weight of the above electrolyte.

14. The electrolyte according to claim 1, wherein the non-aqueous organic solvent is a combination of ethylene carbonate, diethyl carbonate and ethyl methyl carbonate.

* * * * *